Patented Aug. 18, 1942

2,293,031

UNITED STATES PATENT OFFICE 2,293,031

METHOD OF PREPARING AMMONIUM THIOCYANATE

George H. Foster, Stamford, and Charles E. Funk, Jr., Springdale, Conn., assignors to American Cyanamid Company, New York, N. Y., a corporation of Maine No Drawing. Application October 11, 1940, Serial No. 360,744

1 Claim. (Cl. 23—75)

The present invention relates to a continuous method of preparing ammonium thiocyanate.

The principal object of the invention is to devise a continuous method whereby ammonium thiocyanate may be produced from hydrocyanic acid, ammonia as such or as ammonium hydroxide, and sulfur, the latter being carried in ammonium sulfide.

To this end, the invention contemplates continuously adding ammonia, either as such, or as ammonium hydroxide and hydrocyanic acid to a reaction vessel containing an aqueous solution of ammonium thiocyanate, sulfur and ammonium sulfide with agitation, the temperature of the reaction mass being maintained sufficiently low so as to minimize HCN losses. Under these circumstances, maximum quantities of ammonium thiocyanate are formed. The invention further contemplates heating the reaction liquor to a temperature sufficiently high to drive off residual HCN, NH$_3$ and H$_2$S and recovering ammonium thiocyanate crystals from the thus purified liquor. The invention further contemplates either complete evaporation to dryness of the purified reaction liquor or a stepwise recovery through one or more crystallizations, the final mother liquor being preferably returned to the reaction kettle for further recovery of values therein.

The invention further contemplates the detailed and novel steps of the methods hereinafter defined.

Example I

Into a vessel equipped with an agitator, a reflux condenser and two dropping funnels was placed 224 grams of flowers of sulfur, 50 cc. of yellow ammonium sulfide and 100 cc. of water. Into one of the dropping funnels, 700 cc. of aqua ammonia (approximately 210 grams NH$_4$OH) was placed, while 455 cc. of 50% aqueous HCN (approximately 189 grams HCN) was placed in the other.

The agitator was started and the ammonium hydroxide and HCN slowly added over a period of about three hours. The rate of addition of these two reactants was controlled so as to limit the high temperature of the reacting mass through exothermic heat to not over 75° C. The reflux condenser prevented abnormal loss of HCN.

After all the reactants had been added, the mass was filtered to remove residual sulfur and the filtrate heated to approximately 115° C. to drive off residual NH$_3$, H$_2$S and HCN. During this period, some additional free sulfur separated, which was removed. The thus purified liquid was then slowly evaporated to dryness, yielding 497 grams of pure white crystals analyzing 98.5% of NH$_4$SCN. This represented a yield of 94.5%.

Example II

Into a 50 gallon iron kettle fitted with a recirculation pump as a source of agitation and also provided with cooling coils and a reflux condenser was placed 100 pounds of water, 90 pounds of flowers of sulfur, and five pounds of ammonium sulfide. The recirculator pump was started and HCN and ammonia gas dribbled in slowly, that is, at a rate of from one to two pounds per hour. The temperature was maintained below 35° C. through agitation by reason of the cooling coils and also by keeping the rate of addition of ammonia gas and HCN to a low figure. When 75 pounds of HCN and 72 pounds of ammonia gas had been added, the reaction liquor was filtered to remove free sulfur. The filtrate was then evaporated by recirculating the same through a spray nozzle while the liquid was maintained at a temperature of approximately 90° C. This served not only to concentrate the ammonium thiocyanate solution but removed volatile gases such as HCN, NH$_3$ and H$_2$S therefrom. This solution was then subjected to a second hot filtration with Darco as a filter aid to assist in the removal of precipitated sulfur. The clear filtrate was cooled to 20° C. and the crystals formed at that temperature centrifuged and dried. Such first crop of crystals were found to be ammonium thiocyanate of 99.34% purity.

The mother liquor was then evaporated to dryness and ammonium thiocyanate of only slightly less purity recovered therefrom.

It is to be noted that in the above example, upon an analysis, the ammonium thiocyanate was found to contain only .0005% iron. This is rather interesting in view of the well known affinity of thiocyanates for iron. This low contamination, however, is due to the fact that the reaction mixture was kept alkaline, while in contact with iron. Iron thiocyanate will not form under alkaline conditions, or will be destroyed if initially formed under neutral or acid conditions. Consequently, any soluble iron is, under these circumstances, precipitated as the hydroxide.

Example III

Into the apparatus described in Example II, except that it was equipped with a positive agitator as well as a recirculation pump, was placed 145 pounds of 26° Bé. aqua ammonia, five pounds of ammonium sulfide, and 75 pounds of flowers of sulfur. The agitator and recirculation pump were started and HCN slowly added through a line which provided for its introduction at the bottom of the reaction mass. The HCN was added at a rate so that with agitation and cooling, the temperature ranged from 24 to 38° C. 60 pounds of HCN was added over a period of nine hours. The reaction liquor was saved to be combined with that of the next example.

*Example IV*

Into the apparatus of Example III, 180 pounds of 26° Bé. aqua ammonia, 10 pounds of ammonium sulfide and 95 pounds of flowers of sulfur were placed. The agitator and recirculation pump were started and HCN slowly added until 75 pounds had been added over a period of ten hours. During this time, the temperature ranged from 24 to 35° C.

The reaction liquors of Examples III and IV were then mixed and filtered using 7 pounds of Hyflo as a filter aid. The filtrate was then evaporated and recirculated through a spray nozzle at from 87 to 95° C. In 20 hours the specific gravity of the filtrate was 1.169 at 97° C. Three pounds of Darco and 6 pounds of Hyflo were added and the mixture filtered hot. The filtrate was cooled to 30° C. and centrifuged to remove the thus deposited ammonium thiocyanate crystals. They analyzed 99.5% NH4SCN.

The mother liquor from the crystallization step was further evaporated and recirculated through a spray nozzle at from 87 to 95° C. At the end of 13 hours, the specific gravity of the solution was 1.170 measured at 96°. This concentrate was treated with Darco and Hyflo and filtered hot. The filtrate was cooled to 30° C. and the crystals recovered as ammonium thiocyanate of a purity of 99.3%. The mother liquor from this second filtration was evaporated to dryness to recover the residual ammonium thiocyanate therein.

*Example V*

The procedure of Examples III and IV may be operated in a continuous manner by continuing to add requisite amounts of HCN, NH3 or NH4OH and ammonium sulfide. Free sulfur should be added from time to time to insure the presence of a sufficient quantity of this reactant. .42 pound of sulfur is required per pound of thiocyanate to be produced. The use of an excess of substantially .02 pound over this amount will avoid any deficiency.

The reaction liquor may be tapped from time to time and ammonium thiocyanate recovered therefrom as above set forth.

No difficulty will be experienced in maintaining the continuity of the process and the ammonium thiocyanate recovered therefrom will be of exceptional purity.

While the invention has been described with particular reference to specific embodiments, it is to be understood that it is not to be limited thereto but is to be construed broadly and restricted solely by the scope of the appended claim.

We claim:

A method of preparing ammonium thiocyanate containing not over 0.0005% iron which includes the steps of placing in a reaction kettle the following substances in substantially the proportions stated: 145 pounds of 26° Bé. aqua ammonia, 5 pounds of ammonium sulfide solution and 75 pounds of sulfur, feeding in 60 pounds of HCN, maintaining the temperature of the reaction mass below 38° C. in order to avoid loss of ammonia gas, when all of the HCN has been added, filtering to remove insolubles, heating the filtrate to 90° C. to thereby concentrate the ammonium thiocyanate and to remove unreacted HCN, NH3 and H2S, subjecting the concentrated solution to a second hot filtration, cooling the second filtrate to approximately 20° C. to precipitate crystals of ammonium thiocyanate and drying and recovering the same.

GEORGE H. FOSTER.
CHARLES E. FUNK, JR.